May 30, 1950     W. C. KLEINFELDER ET AL     2,509,929
METHOD OF MAKING CABLE JOINTS

Filed March 17, 1948     7 Sheets-Sheet 1

INVENTORS W.C. KLEINFELDER
D. T. SHARPE
BY J. MacDonald
ATTORNEY

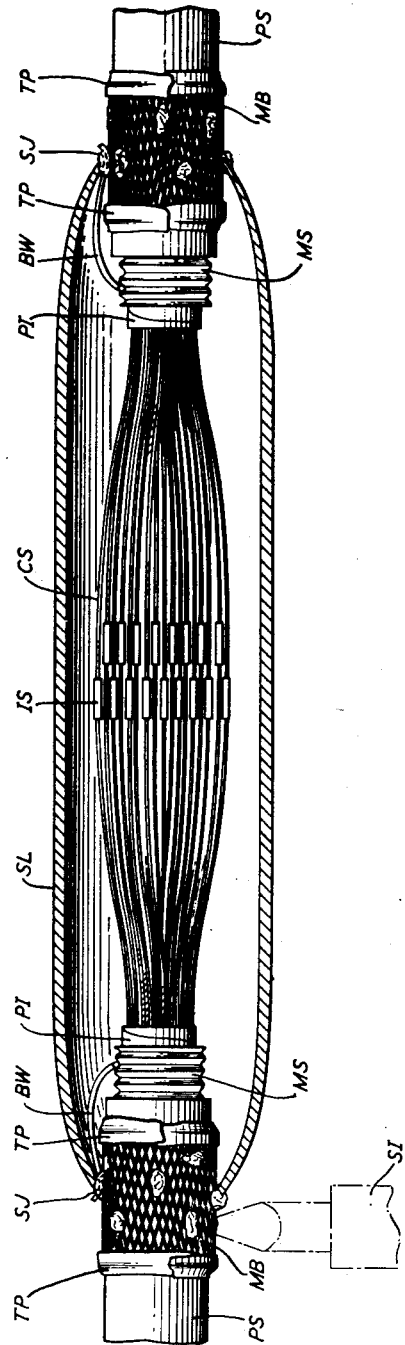
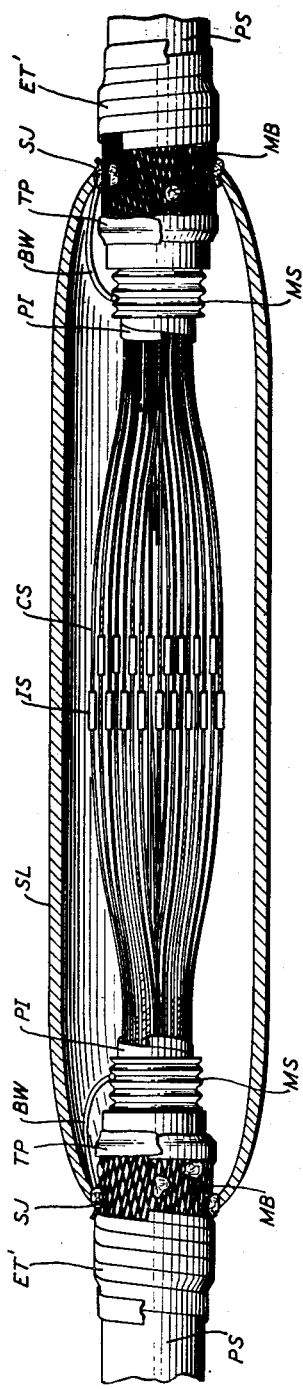

May 30, 1950  W. C. KLEINFELDER ET AL  2,509,929
METHOD OF MAKING CABLE JOINTS
Filed March 17, 1948  7 Sheets-Sheet 3

INVENTORS W.C. KLEINFELDER
D.T. SHARPE
BY J. MacDonald
ATTORNEY

May 30, 1950  W. C. KLEINFELDER ET AL  2,509,929
METHOD OF MAKING CABLE JOINTS

Filed March 17, 1948  7 Sheets-Sheet 4

INVENTORS
W.C. KLEINFELDER
D.T. SHARPE
BY J. MacDonald
ATTORNEY

May 30, 1950 W. C. KLEINFELDER ET AL 2,509,929
METHOD OF MAKING CABLE JOINTS
Filed March 17, 1948 7 Sheets-Sheet 5
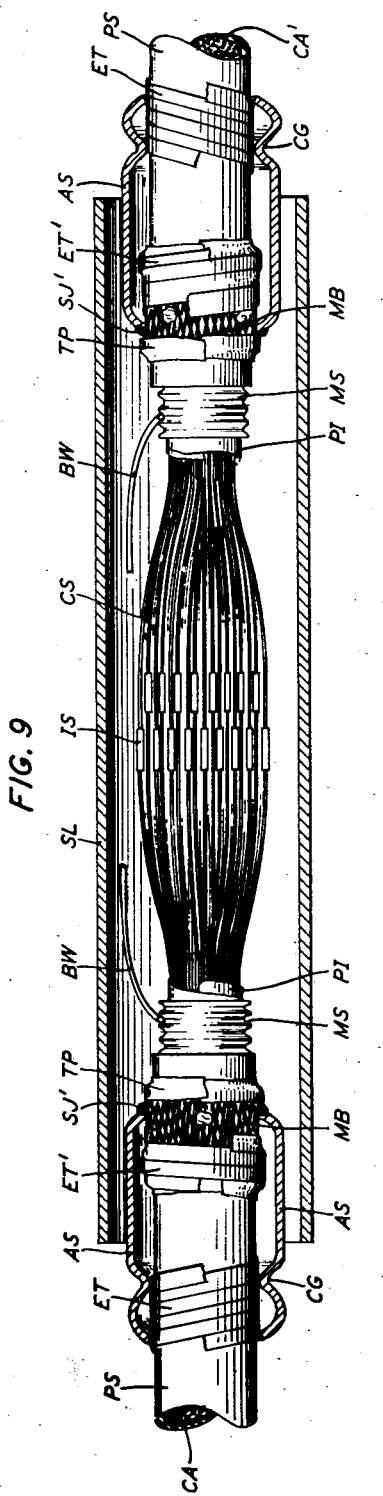
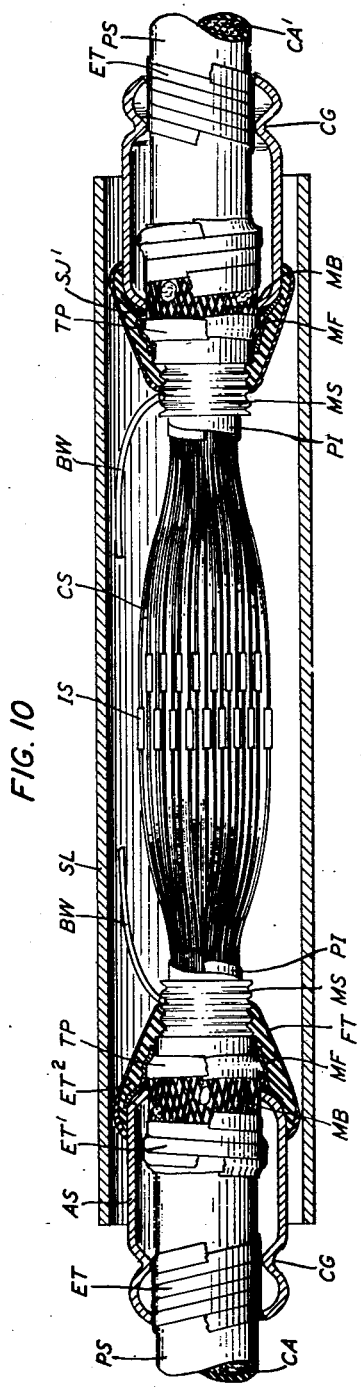
INVENTORS
W. C. KLEINFELDER
D. T. SHARPE
BY J. MacDonald
ATTORNEY

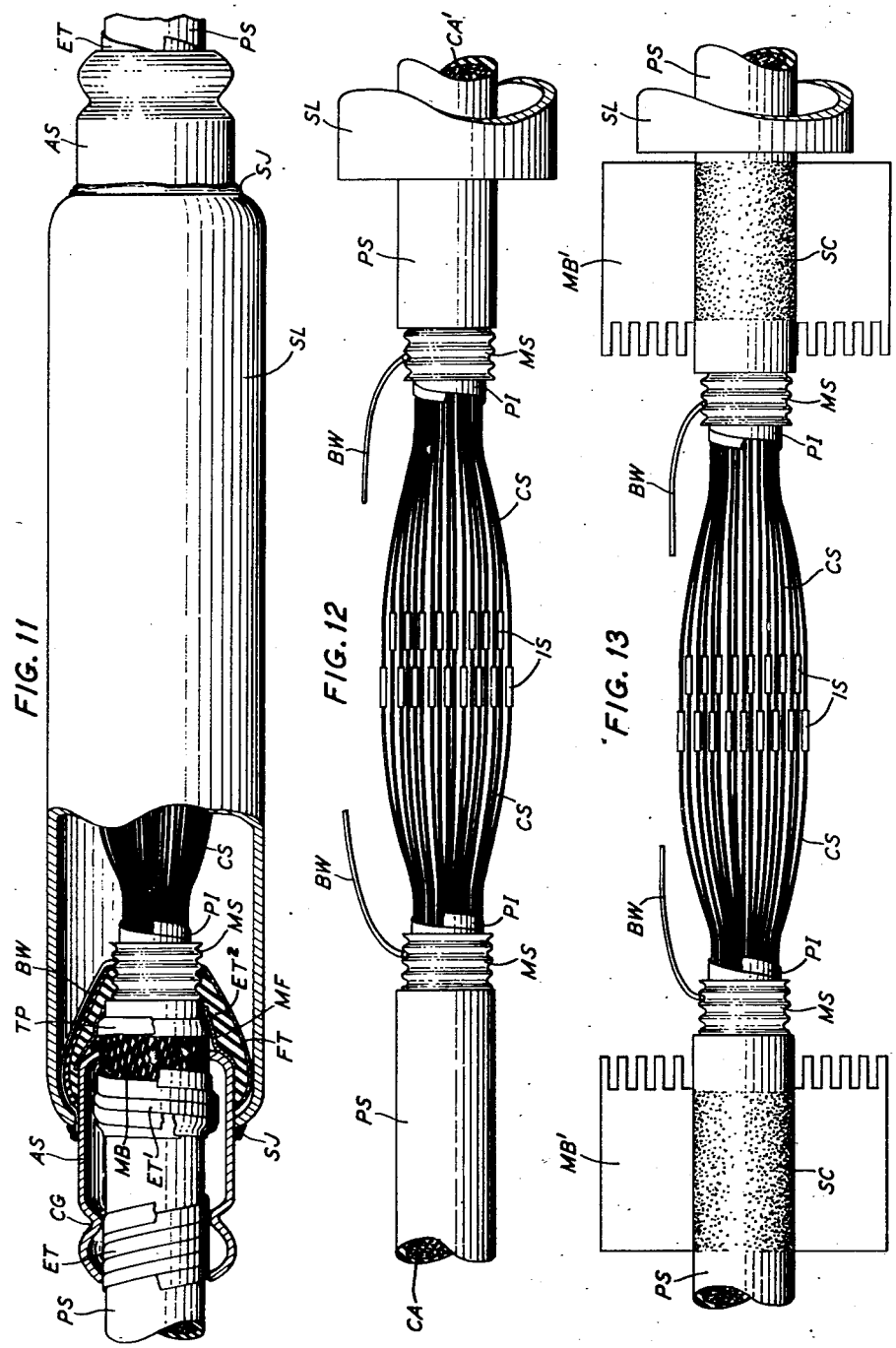

May 30, 1950    W. C. KLEINFELDER ET AL    2,509,929
METHOD OF MAKING CABLE JOINTS
Filed March 17, 1948    7 Sheets-Sheet 7
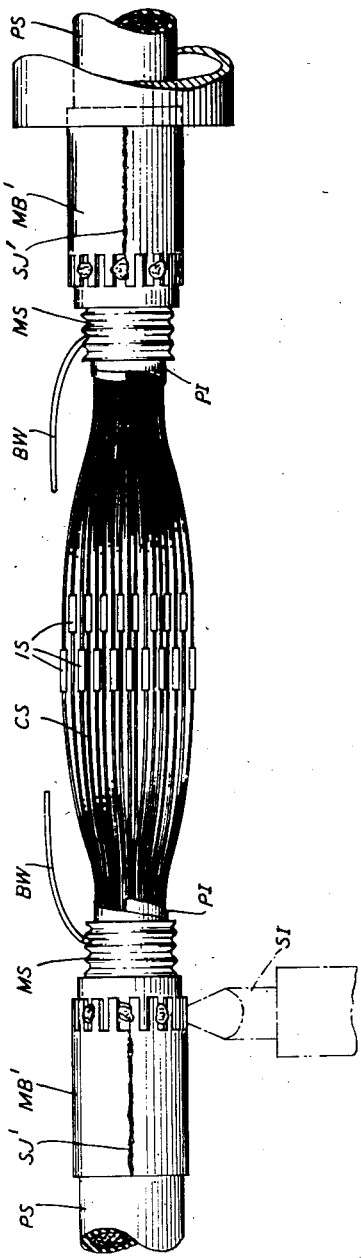
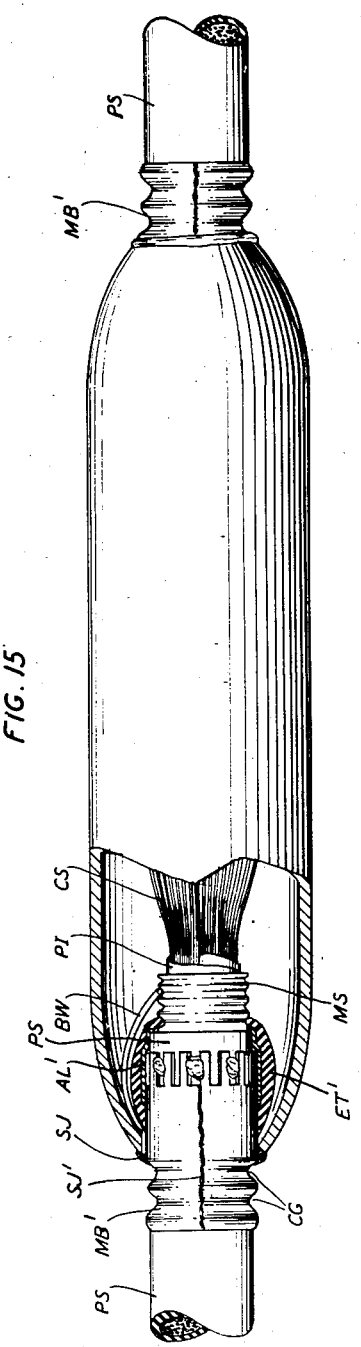
INVENTORS: W.C. KLEINFELDER
D.T. SHARPE
BY J. MacDonald
ATTORNEY Patented May 30, 1950

2,509,929

UNITED STATES PATENT OFFICE 2,509,929

METHOD OF MAKING CABLE JOINTS

Walter C. Kleinfelder, Summit, and Duncan T. Sharpe, Morristown, N. J., assignors to Bell Telephone Laboratories, Incorporated, New York, N. Y., a corporation of New York Application March 17, 1948, Serial No. 15,324

11 Claims. (Cl. 154—2.22)

This invention relates to joints or splices for electrical cable and more particularly to a method and means for making splices in multiconductor thermoplastic sheath cable.

The object of this invention is to provide a method and means for making a joint or splice in electrical cables having an enclosing sheath of thermoplastic and an underlying layer of metal in which the electrical conductivity of the metallic layer is not interrupted and a tight waterproof seal which is as mechanically strong as the cable itself, is provided.

The cable to which this splice is particularly adaptable comprises a plurality of insulated conductors having a jacket of insulating material wrapped therearound, a thin metallic sheath surrounding the insulating jacket and a sheath of thermoplastic enclosing the whole.

The present invention relates to a method and means for making joints or splices in multiconductor cable in which the outer sheath comprises a layer of thermoplastic which has been extruded over a thin sheath of metal and comprises stripping the thermoplastic sheath, metal sheath and insulating jacket from the ends of the cable, to be joined, to expose the individual conductors, joining the individual conductors by twisting their ends together and insulating them from each other in the well-known manner, for example, by insulating sleeves, cutting back the thermoplastic insulation to expose the metallic sheath, positioning a band of perforated metal around the thermoplastic sheath a short distance from the end thereof, positioning a protecting metallic sleeve over the joint, beating it down into intimate contact with and soldering it to the metallic band. Heat is then applied thereto to firmly imbed the metal band in the sheath. A layer of elastomeric tape is applied over said band while it is still hot, applying a layer of metal foil over the soldered joint and a portion of said tape and then applying alternate layers of elastomeric tape and friction tape over the joint so that portions thereof are in contact with the sleeve and said thermoplastic sheath.

The invention will be more clearly understood from the following detailed description when read in connection with the following drawings of which:

Fig. 3 is a view similar to Fig. 2 and shows heat being applied to the perforated metal bands to imbed them in the thermoplastic sheath, the bonding wires located under the beaten down ends of the metal sleeve and the sleeve soldered to the perforated metal bands;

Fig. 4 is a view similar to Fig. 3 and shows layers of elastomeric tape wrapped over portions of the perforated metal bands and the plastic sheath;

Fig. 9 is a view similar to Fig. 8 and shows the inner ends of the auxiliary sleeves beaten down and soldered to the perforated metal bands and the outer ends beaten down and compressed by circumferential grooves into intimate contact with the bands of elastomeric tape and the main metallic sleeve positioned over the splice preparatory to its application thereto;

Fig. 10 is a view similar to Fig. 9 and shows the addition of a metal foil layer and layers of elastomeric and friction tape over the joint;

Fig. 11 is a fragmentary view, partly in section, showing the completed splice and illustrates how the bonding wires are soldered to the metallic sleeve to preserve the electrical continuity of the metallic sheath;

Fig. 12 is a view similar to Fig. 1 and discloses the first step in the preparation of a joint in accordance with a second modification of the invention;

Fig. 13 is a view similar to Fig. 12 and shows slotted and perforated metal bands positioned in such a manner that they may be readily wrapped around the plastic sheath and a layer of sealing compound applied to the thermoplastic sheath;

Fig. 14 is a view similar to Fig. 13 and shows the metal bands in position around the plastic sheath and heat being applied thereto to cause the bands to be imbedded in the sheath; and Fig. 15 is a fragmentary view, partly in section, of the completed splice with the bands firmly anchored to the thermoplastic sheath by means of the embedding and the circumferential groove, and the bonding wires soldered in the joints between the main sleeve and the metallic bands.

Figure 1:
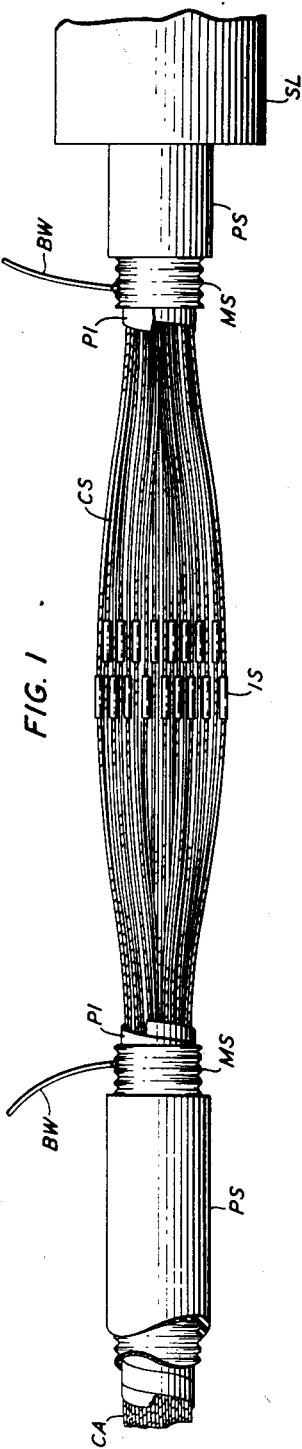
Fig. 1 is a fragmentary view of a thermoplastic sheath cable with the ends prepared for splicing and the conductors joined together and individually insulated and bonding wires soldered to the metallic sheath.
Figure 2:
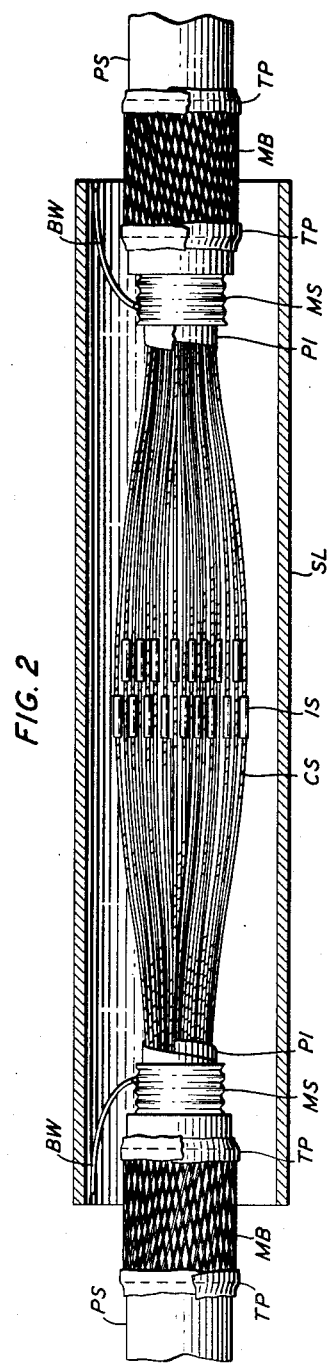
Fig. 2 is a view similar to Fig. 1 and shows perforated metallic bands positioned around the thermoplastic sheath a short distance from the ends thereof and held in place by means of suitable adhesive tapes and a protective metallic sleeve positioned over the spliced conductors.

In the preferred embodiment of our invention as shown in Figs. 1 to 6, inclusive, the ends CA and CA¹ of the cable to be spliced or joined, are prepared as shown, in Fig. 1, that is, the thermoplastic sheath PS has been removed and cut back to expose a substantial portion of the conductors CS, and a small portion of the metal sheath MS and paper insulation PI. A metal sleeve SL is threaded over the cable and positioned ready for use at the proper time and the conductors CS have been joined by twisting their ends together in the well-known manner and insulated from each other by means of the insulating sleeves IS and a bonding wire BW has been soldered to the exposed portion of the metal sheath MS. After completion of the above steps a perforated metal band MB is wrapped snugly around the thermoplastic sheath PS and firmly held in place by means of the tapes TP—TP which are wrapped around the metal band MB close to the ends thereof, as shown in Fig. 2.

As shown in Fig. 3 heat is applied to the perforated metal band MB by any suitable means, for example, by means of a soldering iron SI, to imbed the metal band in the thermoplastic sheath and cause the thermoplastic to seep through the perforations of the band. The end of the sleeve SL is beaten down into intimate contact and soldered to the metal band MB as at SJ with the bonding wire BW therebetween. While the perforated metal band MB and the thermoplastic is still hot and is in a softened condition, a layer of elastomeric tape ET¹ is wrapped around as shown in Fig. 4.

Figure 5:
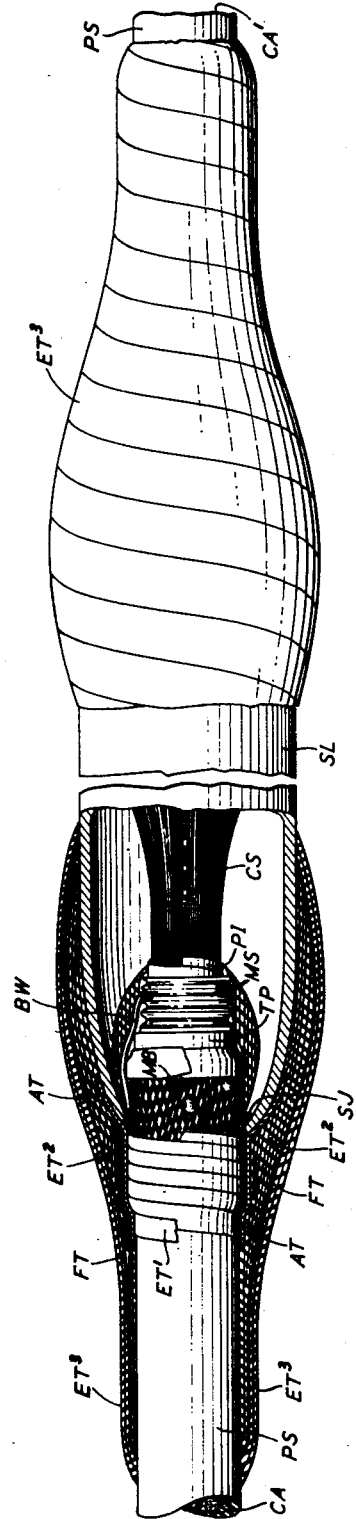
Fig. 5 is a fragmentary view partly in section of the completed splice and shows the various layers of the protecting wrappings.

After the above steps have been completed, the next step, as shown in Fig. 5, is to position a layer of metal foil AT around the joint so that it overlies the soldered joint SJ and the tape ET¹. After the metal foil has been wrapped around the joint as above-described, several layers of elastomeric tape ET² are then wrapped over the entire joint so that it overlies a portion of the sheath PS, all of the tape ET¹, the metal foil AT and a portion of the metal sleeve SL. After the above operations are completed, a layer of friction tape FT is wrapped over the tape ET² and a final layer of elastomeric tape ET³ is wrapped over the friction tape FT as shown to completely enclose and provide a waterproof and mechanically strong joint.

Figure 6:
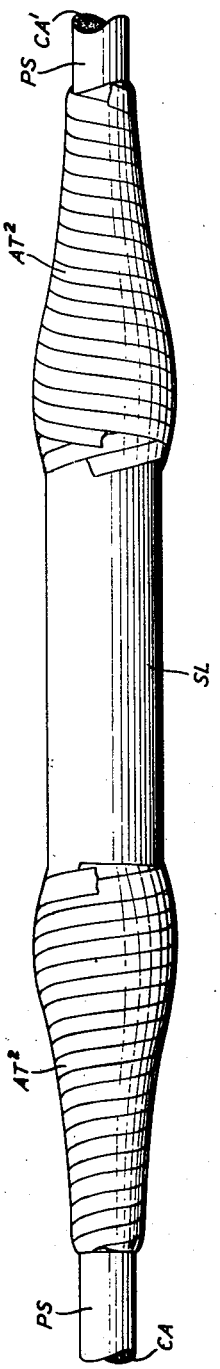
Fig. 6 is an elevational view of a completed splice which has an additional wrapping of metallic tape thereover to reflect and distribute solar heat rays to which the cable may be subjected when the splice is used in aerial cable installations.

In those instances where it is desirable to protect the splice from the effects of solar heat rays, such as for example in the installation of aerial cable, a metal foil wrapping AT², as shown in Fig. 6, is applied over the entire tape wrapping ET³.

Figure 7:
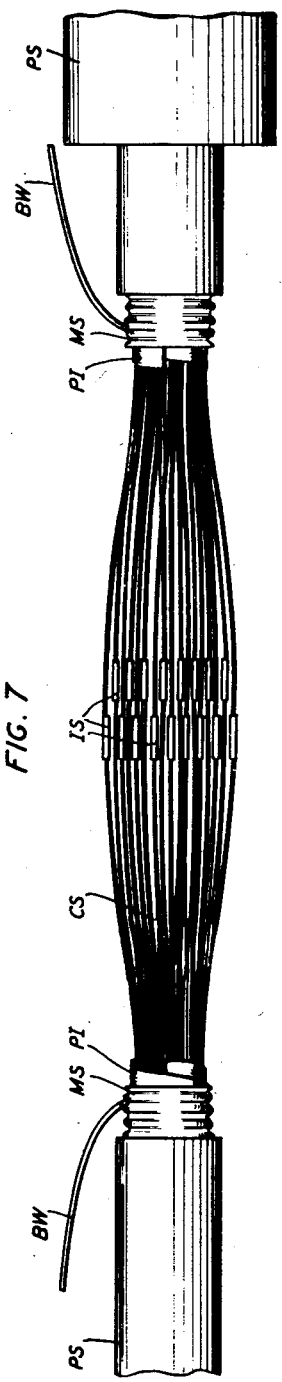
Fig. 7 is a view similar to Fig. 1 and illustrates the first step preparatory to splicing a thermoplastic sheath cable by a modification of the method disclosed in Figs. 1 to 6.

In a modified form of the joint as shown in Figs. 8 to 11 inclusive, the cable is prepared as shown in Fig. 7 which is the same as that for the previously described joint and the method of preparing the cable in this instance is the same as that described with regard to Fig. 1.

Figure 8:
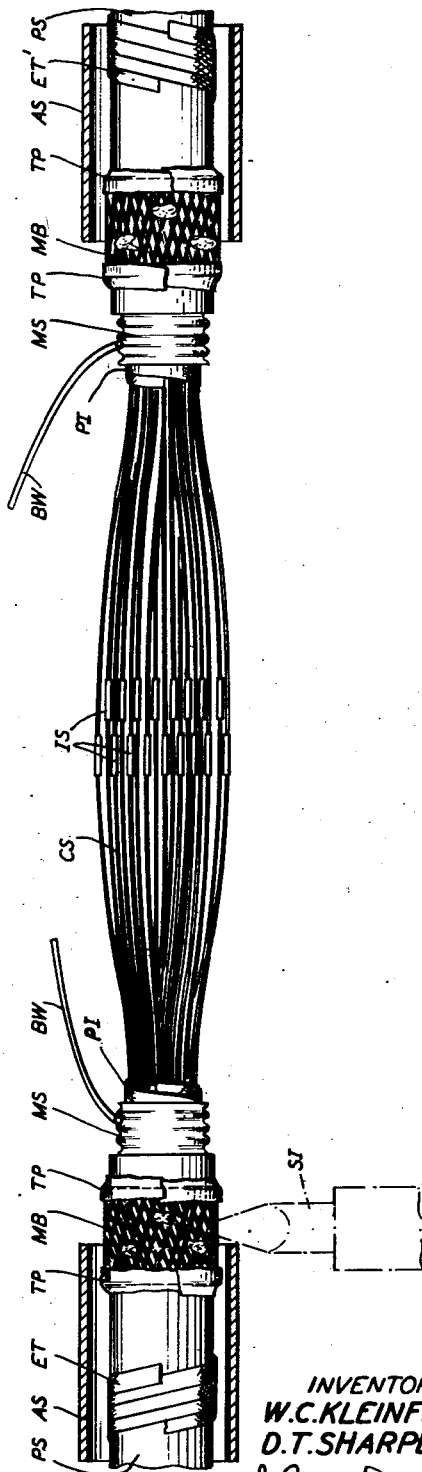
Fig. 8 is a view similar to Fig. 2 except that bands or wrappings of elastomeric tape have been applied to the sheath of the cable a short distance away from the perforated metal bands, heat is being applied to imbed the bands in the sheath, and auxiliary sleeves have been slid over the joint preparatory to their application to the joint.

After the cable has been prepared as shown in Fig. 7, a perforated metal band MB is wrapped snugly around the thermoplastic sheath PS, and firmly held in place by means of the tapes TP—TP, as shown in Fig. 8. A wrapping of elastomeric tape ET is applied as shown, to the thermoplastic sheath PS a short distance from the outer end of the perforated metal band MB and heat is applied to the metal band MB by any suitable means, for example by a soldering iron SI as shown to cause the thermoplastic sheath to soften, to penetrate the interstices of the metal band MB and imbed it in the sheath. As shown in this figure, an auxiliary sleeve or band AS is in position ready to be applied to the cable as shown in Fig. 9 wherein the inner end of the auxiliary sleeve AS, is beaten down and soldered to the perforated metal band MB, at SJ¹ and the outer end of the sleeve is beaten down into intimate contact with the tape wrapping ET. To further insure a watertight seal at this point a circumferential groove CG is introduced in the sleeve AS adjacent the beaten down outer end thereof. As shown in this figure a main sleeve SL, which has been previously threaded over the cable, is in position to be applied over the joint.

After the aforementioned steps have been completed, as shown in Fig. 9, the next step is to apply a layer of metallic foil over the inner portion of the sleeve AS and the soldered joint SJ¹, so that it overlies both the sleeve and a portion of the cable, the next step is to apply a layer of elastomeric tape ET² over the metallic foil MF and finally a layer of friction tape FT is applied over the tape layer ET² to completely enclose the joint as shown in Fig. 10.

The final step in the preparation of the modified joint or splice of this invention, is to beat down the end of the main sleeve SL into intimate contact with the auxiliary sleeve AS, position the bonding wire BW therebetween and solder the main sleeve SL to the auxiliary sleeve at SJ as shown in Fig. 11.

In a further modification of the joint or splice of our invention as shown in Figs. 13 to 15, inclusive, the cable is prepared as shown in Fig. 12 which is substantially the same procedure as that for the previously described joints or splices.

After the cables CA and CA¹ are prepared as shown in Fig. 12, a layer of sealing compound SC is applied to the cable end, a slotted and perforated metal band MB¹ is positioned around the thermoplastic sheath PS as shown in Fig. 13, it is then wrapped snugly around the cable sheath with its unslotted portion overlying said sealing compound and secured in place by soldering along the seam SM as shown in Fig. 14. After the metal MB¹ is secured in place as above-described, heat is applied as shown by means of any suitable device such as for example by means of the soldering iron SI to cause the thermoplastic sheath PS to soften, penetrate the slots and perforations in the metal band MB¹ and cause the band to be imbedded in the sheath as shown in this figure, thereby adequately securing the band MB¹ in place on the sheath PS of the cable.

After the metal band MB¹ has been secured in place as above-described, and as shown in Fig. 15, a wraping of metal foil AL with an overlying layer of elastomeric tape ET¹ is applied over the inner end of the metal band MB¹ and the exposed portion of the cable. The outer end of the metal band MB¹ is then forced into intimate contact with the thermoplastic sheath PS by means of constructions or circumferential grooves CG—CG applied thereto. The final steps in the completion of the joint is to beat down the end of the sleeve SL into intimate contact with the band MB¹, position the bonding wire BW therebetween and solder the sleeve SL to the metal band MB¹ at the juncture SJ thereby completing the splice.

While we have shown and described herein the preferred embodiments of our invention, it is to be understood that various modifications and changes may be made therein without departing from the spirit of the invention and we are only limited by the scope of the appended claims.

What is claimed is:

1. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, positioning a metal sleeve over said spliced conductors, beating down each end of said sleeve into intimate contact with said metal bands, and soldering said sleeve thereto and then applying a waterproof wrapping over each of said bands, and over portions of said sheath and said sleeve.

2. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, applying a layer of tape over each of said bands, positioning a metal sleeve over said spliced conductors, beating down each end of said sleeve into intimate contact with said metal bands, and soldering said sleeve thereto and then applying a waterproof wrapping over each of said bands, and over portions of said sheath and said sleeve.

3. A method of making a splice in thermoplastic sheath cable which comprises removing from the ends of the cable to be joined sufficient sheath to expose a substantial length of the conductors, splicing said conductors together, applying over the sheath of each cable an encircling band of perforated metal, applying heat to said bands, applying a layer of tape over each of said bands, positioning a metal sleeve over said spliced conductors, beating down each end of said sleeve into intimate contact with said metal bands and soldering said sleeve thereto, applying a layer of metal foil over said soldered joints, said layers of tape and said sleeve and then applying a waterproof wrapping over each of said bands and over portions of said sheath and said sleeve.

4. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, applying a layer of tape over each of said bands, positioning a metal sleeve over said spliced conductors, beating down each end of said sleeve into intimate contact with said metal bands and soldering said sleeve thereto, applying a layer of metal foil over said soldered joints, said layers of tape and said sleeve and then applying a multiplicity of layers of waterproof wrappings over said metal foil, said tape, and over a portion of said sleeve and said sheath.

5. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said band, applying a layer of tape over each of said bands, positioning a metal sleeve over said spliced conductors, beating down each end of said sleeve into intimate contact with said metal bands and soldering said sleeve thereto, applying a layer of metal foil over said soldered joints, said layers of tape and said sleeve and then applying a multiplicity of layers of waterproof wrapping over said metal foil, said tape, and over a portion of said sleeve and said sheath and a layer of metal foil over said waterproof wrapping.

6. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, applying wrappings of suitable material around said sheath adjacent each of said bands, positioning short metallic sleeves over said bands and said wrappings, beating down the inner ends thereof into intimate contact with said bands and beating down said outer ends into intimate contact with said wrappings, applying layers of waterproof wrapping over the inner ends of said sleeves and said cable sheath, positioning over said sleeves and said spliced conductors a second sleeve, and beating down the ends of said second sleeve into intimate contact with said first sleeves and soldering said second sleeve thereto.

7. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, applying a layer of tape over each of said bands, applying wrappings of suitable material around said sheath adjacent said bands, positioning short metal sleeves over said bands and said wrappings and beating down the inner ends thereof into intimate contact with said bands and beating down said outer ends into intimate contact with said wrappings, applying layers of waterproof wrapping over the inner end of said sleeve and cable sheath, positioning over said sleeves and said spliced conductors a second sleeve, beating down the ends of said second sleeve into intimate contact with said first sleeves and soldering said second sleeve thereto.

8. A method of making a splice in thermoplastic sheath cable which comprises removing from the ends of the cable to be joined sufficient sheath to expose a substantial length of the conductors, splicing said conductors together, applying over the sheath of each cable end an encircling band of perforated metal, applying heat to said bands, applying a layer of tape over each of said bands, applying wrappings of suitable material around said sheath adjacent each of said bands, positioning short metallic sleeves over said bands and said wrappings and beating down the inner ends thereof into intimate contact with said bands and beating down said outer ends into intimate contact with said wrappings, constricting the outer ends of said sleeves to provide circumferential grooves therein, applying layers of waterproof wrapping over the inner ends of said sleeves and said cable sheath, positioning over said sleeves and said spliced conductor a second sleeve, and beating down the ends of said second sleeve into intimate contact with said first sleeves and soldering said second sleeve thereto.

9. A method of making a splice in thermoplastic sheath cable which comprises removing from the ends of the cable to be joined sufficient sheath to expose a substantial length of the conductors, splicing said conductors together, applying over the sheath at each cable end encircling metallic bands having a plurality of slots and perforations therein, applying heat to said bands, positioning over said spliced conductors and said bands a protecting sleeve, beating down the ends of said sleeve into intimate contact with said bands and soldering said sleeve thereto.

10. A method of making a splice in thermoplastic sheath cable which comprises removing from the ends of the cable to be joined sufficient sheath to expose a substantial length of the conductors, splicing said conductors together, applying over the sheath at each cable end encircling metallic bands having a plurality of slots and perforations therein, applying heat to said bands, applying a layer of tape over said slotted portions of said bands and the exposed portions of said cable, positioning over said spliced conductors and said bands a protecting sleeve, beating down the ends of said sleeve into intimate contact with said bands and soldering said sleeve thereto.

11. A method of making a splice in thermoplastic sheath cable which comprises removing from the ends of the cable to be joined sufficient sheath to expose a substantial length of the conductors, splicing said conductors together, applying over the sheath at each cable end encircling metallic bands having a plurality of slots and perforations therein, applying heat to said bands, applying a layer of tape over said slotted portions of said bands and the exposed portions of said cable, positioning over said spliced conductors and said bands a protecting sleeve, beating down the ends of said sleeve into intimate contact with said bands and soldering said sleeve thereto and constricting the outer ends of said bands by providing circumferential grooves therein to force said bands into intimate contact with said sheath.

WALTER C. KLEINFELDER.
DUNCAN T. SHARPE.

REFERENCES CITED

The following references are of record in the file of this patent:

UNITED STATES PATENTS

| Number | Name | Date |
| --- | --- | --- |
| 1,680,231 | Simons | Aug. 7, 1928 |
| 1,965,540 | Atkinson | July 3, 1934 |
| 2,290,706 | Phillips | July 21, 1942 |
| 2,435,284 | Lodge | Feb. 3, 1948 |
| 2,442,193 | Brazier | May 25, 1948 |